(12) United States Patent
Nakamura et al.

(10) Patent No.: US 7,196,676 B2
(45) Date of Patent: Mar. 27, 2007

(54) INFORMATION TERMINAL AND INFORMATION TERMINAL CONTROL METHOD

(75) Inventors: Kenji Nakamura, Saitama (JP); Michio Sakano, Saitama (JP); Shinichi Sugie, Saitama (JP); Kenji Mito, Saitama (JP); Naoaki Horiuchi, Saitama (JP); Masataka Izawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 419 days.

(21) Appl. No.: 10/419,999

(22) Filed: Apr. 22, 2003

(65) Prior Publication Data
US 2003/0231143 A1 Dec. 18, 2003

(30) Foreign Application Priority Data
Apr. 22, 2002 (JP) ............................. P. 2002-118978

(51) Int. Cl.
*G09G 5/00* (2006.01)
(52) U.S. Cl. ........................................ 345/1.1; 345/1.3
(58) Field of Classification Search ................ 345/1.1, 345/1.2, 1.3, 4, 901, 902, 903, 905, 3.1, 3.2, 345/9, 87, 90, 98, 99, 100, 204; 361/681; 455/575.4
See application file for complete search history.

(56) References Cited

U.S. PATENT DOCUMENTS

| | | | | |
|---|---|---|---|---|
| 5,396,257 A | * | 3/1995 | Someya et al. | 345/1.1 |
| 5,467,102 A | * | 11/1995 | Kuno et al. | 345/1.3 |
| 5,814,431 A | * | 9/1998 | Nagasaka et al. | 430/281.1 |
| 6,628,243 B1 | * | 9/2003 | Lyons et al. | 345/1.1 |
| 6,819,304 B2 | * | 11/2004 | Branson | 345/1.3 |
| 6,882,326 B2 | * | 4/2005 | Hirayama et al. | 345/1.1 |
| 2002/0021258 A1 | * | 2/2002 | Koenig | 345/1.1 |
| 2005/0083642 A1 | * | 4/2005 | Senpuku et al. | 361/681 |

* cited by examiner

*Primary Examiner*—Bipin Shalwala
*Assistant Examiner*—Nitin Patel
(74) *Attorney, Agent, or Firm*—Sughrue Mion, PLLC

(57) ABSTRACT

An information terminal such as a PDA (personal digital assistant) having a plurality of display screens in particular. The information terminal is provided with a plurality of display devices stored so that they can be developed in a main unit of the information terminal. The information terminal includes a controller which controls start and display of any application displayed on each of the display devices. The controller displays a plurality of applications in a predetermined order each time the display devices are developed.

21 Claims, 7 Drawing Sheets

TURN OFF POWER SWITCH ~S131

UPDATE REFERENCE TABLE ~S132

TERMINATE APPLICATION ~S133

TURN OFF POWER ~S134

| DISPLAY DEVICE | PRIORITY (DEFAULT) | | | | USER SETTING |
| --- | --- | --- | --- | --- | --- |
| | 1 | 2 | 3 | 4 | |
| 1a | A | A | B | C | A |
| 1b | B | D | A | G | B |
| 1c | C | E | F | H | C |
| ACTIVATION | NO. 1 | NO. 1 | NO. 1 | NO. 1 | NO. 2 |

| DISPLAY DEVICE | PRIORITY (DEFAULT) | | | | USER SETTING |
| --- | --- | --- | --- | --- | --- |
| | 1 | 2 | 3 | 4 | |
| 1a | A | A | B | C | J |
| 1b | B | D | A | G | K |
| 1c | C | E | F | H | L |
| ACTIVATION | NO. 1 | NO. 1 | NO. 1 | NO. 1 | NO. 3 |

INFORMATION TERMINAL AND INFORMATION TERMINAL CONTROL METHOD

The present disclosure relates to the subject matter contained in Japanese Patent Application No. 2002-118978 filed Apr. 22, 2002, which is incorporated herein by reference in its entirety.

BACKGROUND OF THE INVENTION

1. Field of the Invention

This invention relates to an information terminal such as a PDA (personal digital assistant) and in particular to an information terminal having a plurality of display screens, an information terminal control method, and an information terminal display control program.

2. Background Art

In recent years, a situation in which a plurality of applications are started and displayed on a display screen has occurred frequently as information terminals go multifunctional. If a plurality of applications are started on one screen, windows overlap on the screen. Thus, it becomes necessary to adjust the window size so as to display the target window or display the target window at the top of the stack for activation, and there is a problem of intricate operation. Particularly, an information terminal with a small display screen produces display hard to see and has a pointing device, etc., designed compact and therefore delicate operation is required and thus the problem is noticeable.

To enlarge a display area, a terminal provided with a plurality of display devices in such a mode displaying one application or window on each display device is also proposed. However, the operator of the terminal must specify the application and needs to start and display applications one at a time on each screen, leading also to a problem of intricate operation.

By the way, even if a plurality of applications are installed, often the usually used application is fixed. To start a plurality of applications for use, often the applications are related to each other. However, the operator must manually start the application as described above and thus needs to start the same application each time after turning on the power of the terminal.

SUMMARY OF THE INVENTION

It is therefore an object of the invention to provide an information terminal, an information terminal control method, and an information terminal display control program for making it possible to improve ease of use when a plurality of applications are started in an information terminal having a plurality of display devices.

The invention provides an information terminal including: a plurality of display devices stored so that they can be developed; and a controller which controls start and display of any application to be displayed on each of the display devices. The controller displays a plurality of applications in a predetermined order each time the display devices are developed.

The invention provides a display control method of an information terminal, wherein a plurality of display devices stored in the information terminal so that they can be developed. The method includes: setting start and display of applications in a predetermined order; and controlling start and display of any application to be displayed on each of the display devices in the predetermined order each time the display devices are developed.

The invention provides a display control program of an information terminal, wherein the information terminal includes a plurality of displays and a computer, and the plurality of displays are stored in the information terminal so that they can be developed. The display control program for causing the computer to function as: a controller which controls start and display of applications to be displayed on each of the display devices in the predetermined order each time the display devices are developed.

According to these configurations, the applications to be displayed on the display device are displayed in a predetermined order each time the display devices are developed, so that ease of use can be improved when a plurality of applications are started in the information terminal having a plurality of display devices.

The invention provides an information terminal, including: a plurality of display devices; and a controller which controls start and display of any application to be displayed on each of the display devices. The controller references a table in which priority of a plurality of applications is set, and determines the applications to be displayed on the display devices.

The invention provides a display control method of an information terminal, wherein the information terminal includes a plurality of display devices to display applications. The method includes: referencing a table in which priority of a plurality of applications is set; and determining the applications to be displayed on the display devices in accordance with the priority.

The invention provides a display control program of an information terminal, wherein the information terminal includes a plurality of display devices and a computer. The program causes the computer to function as: a controller which references a table in which priority of a plurality of applications is set, and determines the applications to be displayed on the display devices.

According to these configurations, the applications to be displayed on the display devices are started as the table in which the priority of a plurality of applications is set is referenced, so that ease of use can be improved when a plurality of applications are started in the information terminal having a plurality of display devices.

BRIEF DESCRIPTION OF THE DRAWINGS

The present invention may be more readily described with reference to the accompanying drawings: in which

FIG. 4 is a flowchart to show a flow of the application start and display operation when power is turned on;

DETAILED DESCRIPTION OF THE PREFERRED EMBODIMENTS

Referring now to the accompanying drawings, there is shown a preferred embodiment of an information terminal according to the invention.

Figure 1:
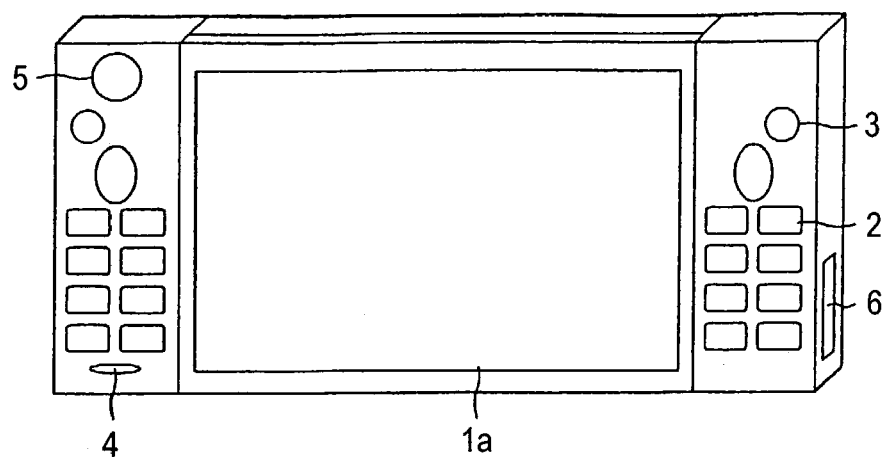
FIG. 1 is a perspective view to show the appearance of an information terminal according to the invention (when display devices are accommodated)
Figure 2:
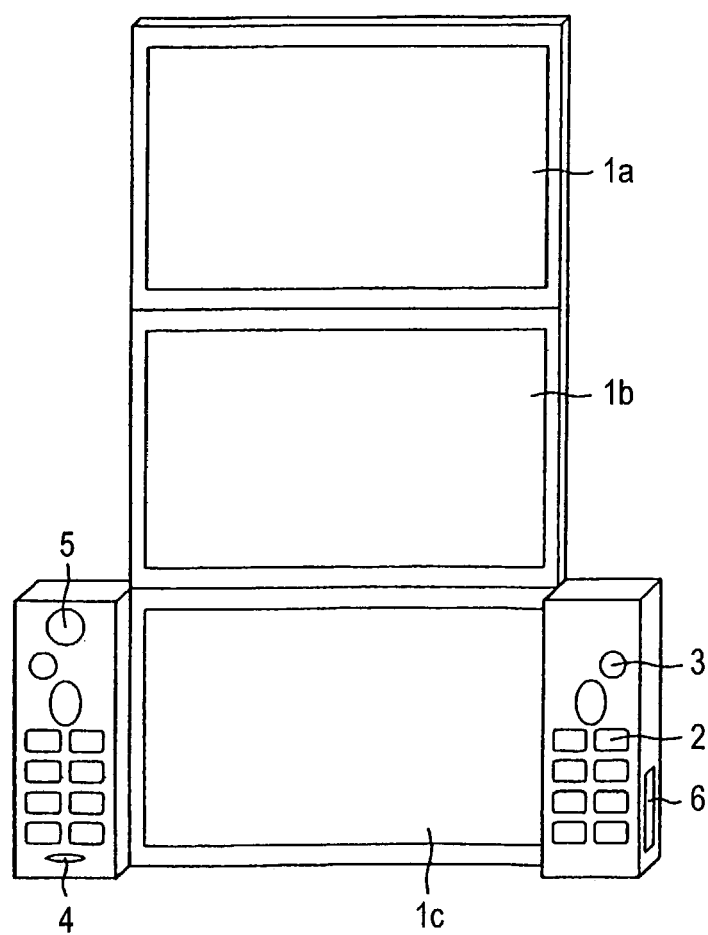
FIG. 2 is a perspective view to show the appearance of the information terminal according to the invention (when display devices are developed (unfolded))

FIGS. 1 and 2 are perspective views to show the appearance of an information terminal according to an embodiment of the invention. The information terminal in the embodiment has three display devices; usually only one display device is exposed and the remaining two display devices are stored in a folding manner (FIG. 1). As the front display device is developed (unfolded) upward, the three display devices are exposed (FIG. 2).

The information terminal 100 in the embodiment mainly includes a display device 1a, a keyboard 2, loudspeakers 3, a microphone 4, a camera 5, and an expansion slot 6. The display device 1 is implemented as a liquid crystal panel, etc., for producing various types of display. The keyboard 2 is provided with various buttons and switches for the user to enter data, commands, etc., in the information terminal 100. The loudspeakers 3 and the microphone 4 are provided for voice output and voice input and the camera 5 is used to input image data; various known members may be used. The expansion slot 6 is an interface section to insert a function extension card such as a memory card or a communication card. As shown in FIG. 2, if the folded display devices are developed (unfolded), three display devices (1a, 1b, and 1c) are exposed.

Figure 3:
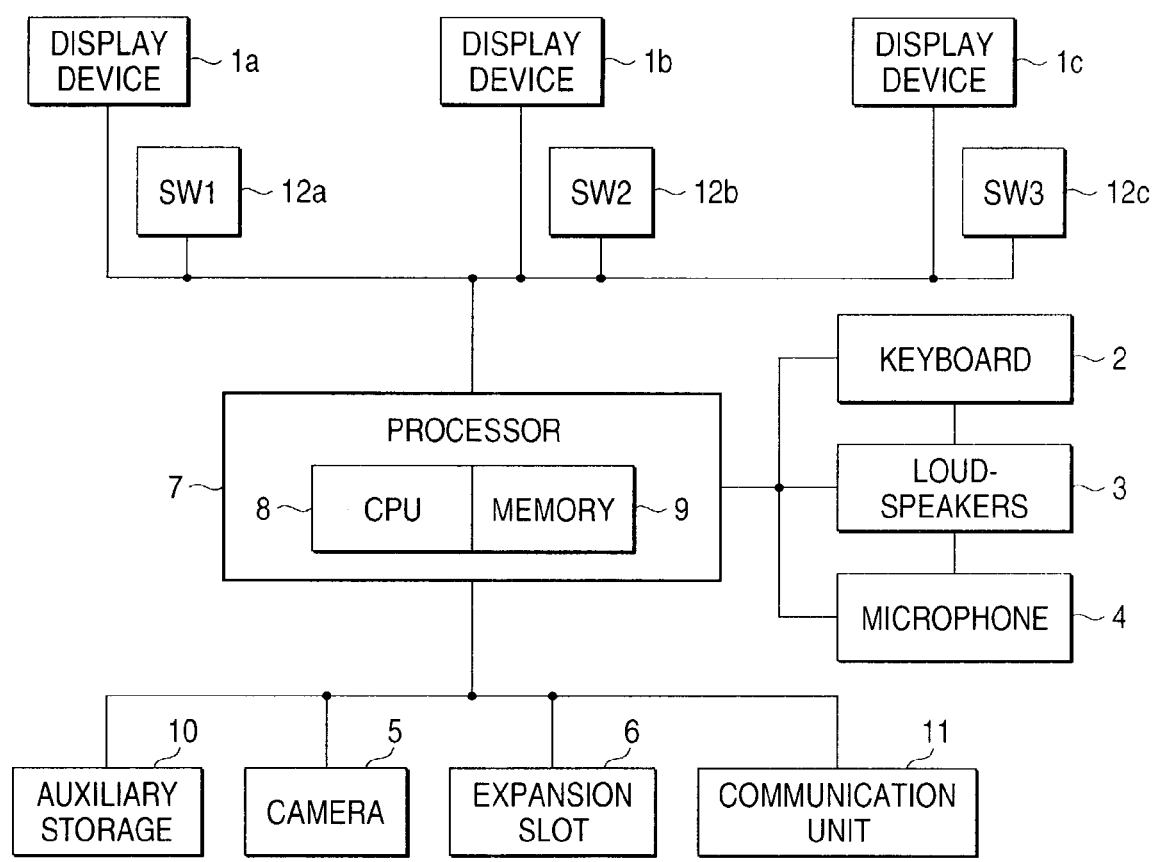
FIG. 3 is a block diagram of the information terminal according to the embodiment of the invention.

FIG. 3 is a block diagram of the information terminal in the embodiment of the invention. The information terminal 100 includes a processor 7 as control means for controlling start and display of any application to be displayed on each display devices, and the processor 7 includes a central processing unit (CPU) 8 and memory 9. Connected to the processor 7 are the display devices 1, the keyboard 2, the loudspeakers 3, the microphone 4, the camera 5, the expansion slot 6, auxiliary storage 10, a communication unit 11, and state detection switches 12 of the display devices. The code of a program for implementing the invention and the like are recorded on the auxiliary storage 10. The communication unit 11 makes it possible to transmit and receive data through a radio telephone network, etc. The state detection switches 12 of the display devices detect the corresponding display devices being developed (unfolded) or stored (folded). When the display device is developed (unfolded), the corresponding state detection switch 12 allows a power supply controller (not shown) to turn on the power of the display device; when the display device is stored (folded), the corresponding state detection switch 12 allows the power supply controller to turn off the power of the display device.

FIGS. 4 to 7 are flowcharts to show flows of start, display, and termination of application and reference table update operation in the information terminal. In the invention, when the power of the terminal is turned on or when the display device is developed (unfolded) or stored (folded), applications are automatically displayed on each display device according to a predetermined order. The application display order can follow a preset reference table. The format of the reference table is described later in detail.

Figure 4:
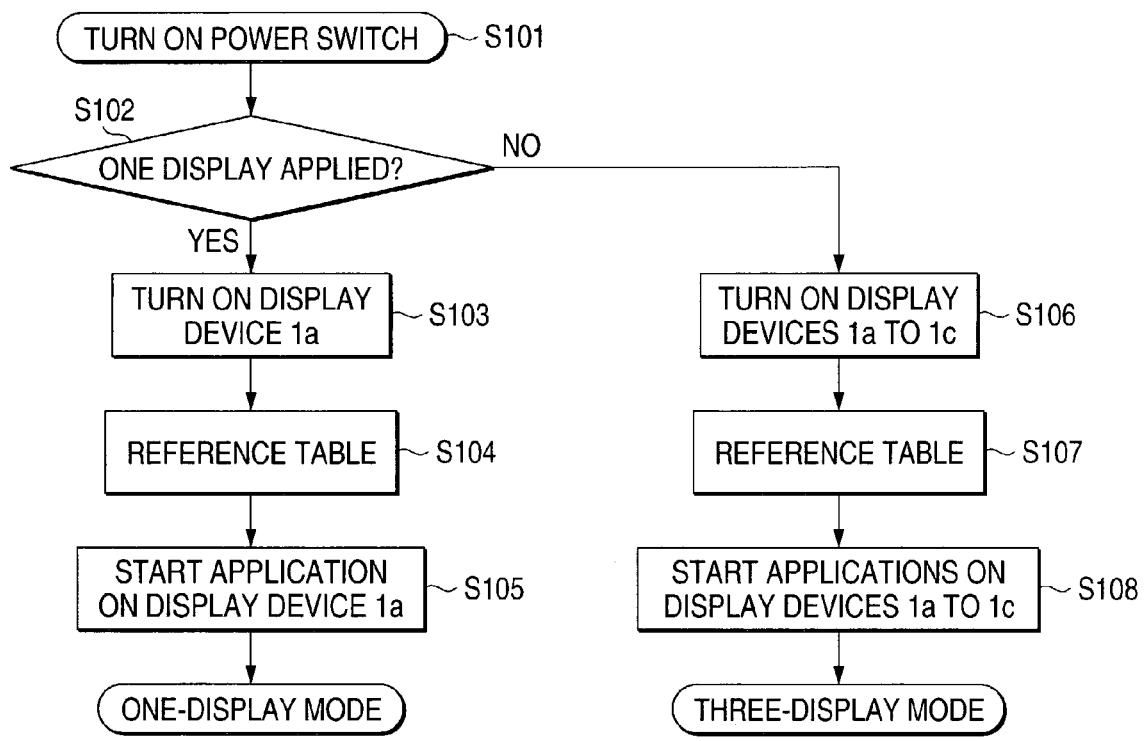

First, FIG. 4 is a flowchart to show a flow of the application start and display operation when the power is turned on. When a power switch is turned on (step S101), the CPU 8 of the processor 7 detects the display devices being developed (unfolded) or stored (folded) on the switches 12 (step S102). When only one display screen is applied, the CPU 8 turns on the power of the display device 1a (step S103) and then references the reference table (S104) and starts and displays the corresponding application on the display device 1a (step S105). On the other hand, when the three display devices are already developed (unfolded) and exposed at step S102, the CPU 8 turns on the power of the display devices (step S106), references the reference table (S107), and starts and displays the corresponding applications on the display devices (step S108).

Figure 5:
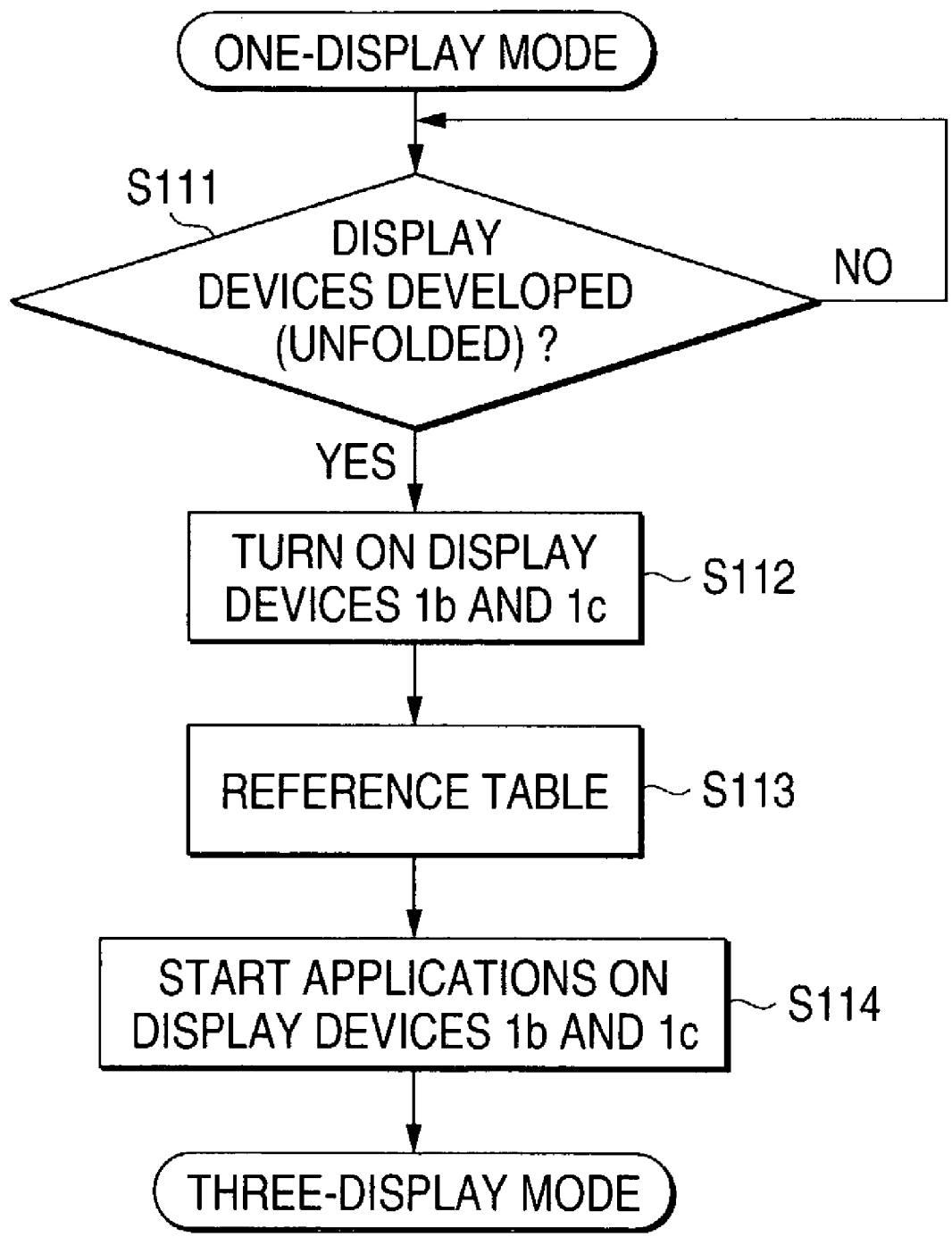
FIG. 5 is a flowchart to show a flow of the application start and display operation when the display devices are developed (unfolded) to three-display mode from one-display mode.

Next, FIG. 5 is a flow chart to show a flow of the application start and display operation when the display devices are developed (unfolded) to three-display mode from one-display mode. When the switches 12b and 12c detect the display devices 1b and 1c being developed (unfolded) (step S111), the processor 7 turns on the power of the display devices 1b and 1c (step S112), references the reference table (S113), and starts and displays the corresponding applications on the display devices 1b and 1c (step S114).

Figure 6:
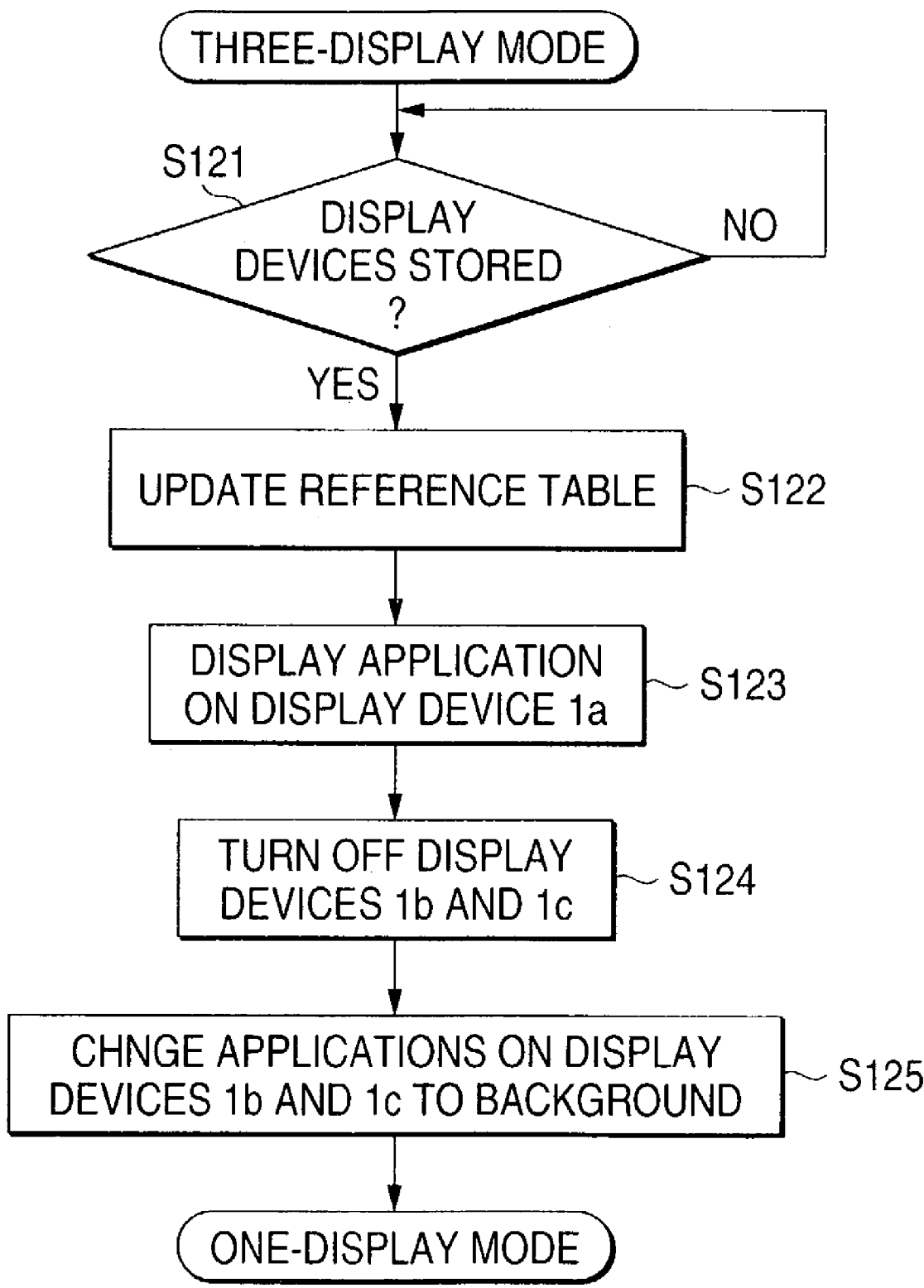
FIG. 6 is a flowchart to show a flow of the application display operation and the reference table update operation when the display devices are stored (folded) to the one-display mode from the three-display mode.

Next, FIG. 6 is a flow chart to show a flow of the application display operation and the reference table update operation when the display devices are stored (folded) to the one-display mode from the three-display mode. When the switches 12b and 12c detect the display devices 1b and 1c being stored (folded) (step S121), the CPU 8 of the processor 7 updates the contents of the reference table so as to display the active application at present (just before the display devices are stored (folded)) on the display device 1a (S122), and displays the corresponding application on the display device 1a (step S123). Next, the CPU 8 turns off the power of the display devices 1b and 1c (step S124) and changes the applications operating on the display devices 1b and 1c to background operation (step S125).

Figures 7, 8A, 8B:
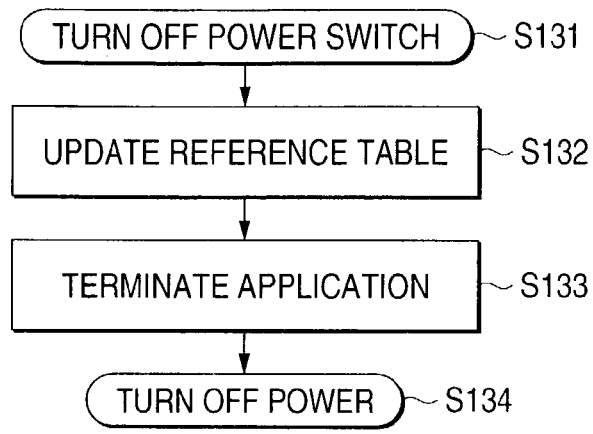
FIG. 7 is a flowchart to show a flow of the application termination operation and the reference table update operation when the power is turned off.
FIGS. 8A and 8B are conceptual drawings showing format examples of the reference table.

Next, FIG. 7 is a flow chart to show a flow of the application termination operation and the reference table update operation when the power is turned off. When the power switch is turned off (step S131), the CPU 8 updates the reference table based on the contents of the application operating on each display device at present (just before the power is turned off), the active application, etc., (step S132) and performs the application termination operation (step S133) and then turns off the power (step S134).

By the way, when all display devices are exposed, one application to conduct work is selected and is activated. To do this, a button on the keyboard 2 may be pressed or, for example, each display screen may be equipped with a touch panel sensor so that the screen touched by the user is activated. On the other hand, if applications operating in the background exist as the developed (unfolded) display devices are stored (folded), it is possible to activate the applications on the exposed display device by pressing a button on the keyboard 2, etc., for example.

FIG. 8 is a conceptual drawing to show a format example of the reference table. The reference table is assigned with applications started and displayed on the display devices when the terminal is started.

The application start and display operation and the reference table update operation responsive to the terminal power on operation and the display developing (unfolding) and storing (folding) operation will be discussed based on the reference table shown in FIG. 8A.

For example, if the user turns on the power of the terminal with only one display device 1a exposed, normally application A is started according to the column of priority 1. Then, when the user exposes the display devices 1b and 1c, applications B and C are started. At this time, if the user presses an arbitrary button on the keyboard 2, etc., for entering a command to start other applications, applications D and E are started according to the column of priority 2 in place of the applications B and C. Whenever the user presses the button, the columns wherein the application started on the display device 1a is the application A (in this case, priority 1 and priority 2) may be switched so as to change the applications started on the display devices 1b and 1c.

After the user turns on the power of the terminal with only one display device 1a exposed and the application A is started, if the user manually terminates the application A and starts the application B (application interrupt start), when the user then exposes the display devices 1b and 1c, applications A and F are started according to the column of priority 3 wherein the application started on the display device 1a is the application B. Likewise, if the application C is started on the display device 1a, when the display devices 1b and 1c are then exposed, applications G and H are started according to the column of priority 4 wherein the application started on the display device 1a is the application C.

For example, if the applications A, B, and C are started on the display devices 1a, 1b, and 1c respectively (application start according to the column of priority 1) and the user works on the display device 1b at present (namely, the application B is active), when the user then stores (folds) the display devices 1b and 1c, the application B which is active is displayed on the display device 1a and the applications A and C operate in the background. At this time, the active application is changed from A to B and therefore the change contents are described in the column of user setting in the reference table (the application activated at the power on time is changed from A to B). Then, when the display devices are again developed (unfolded) and all display devices are exposed, the applications A, B, and C are displayed on the display devices 1a, 1b, and 1c respectively (restored to the former display devices), but the display device 1b becomes active.

Figure 9:
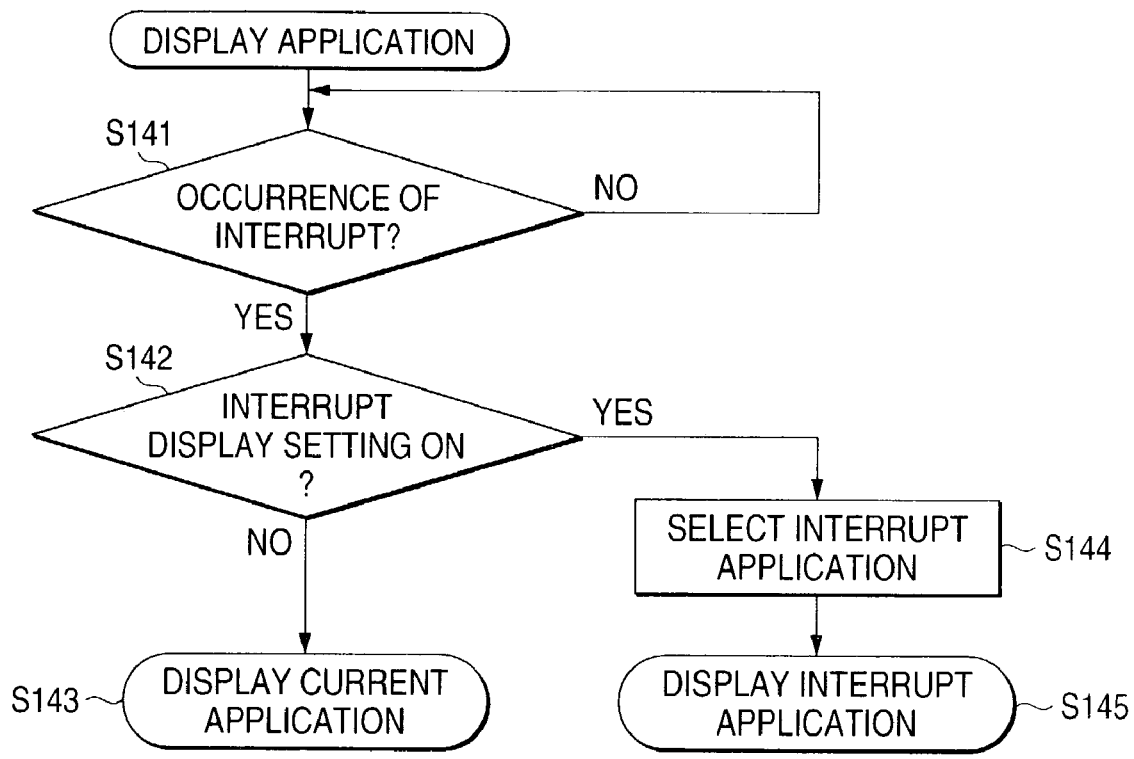
FIG. 9 is a flowchart to show a flow of interrupt start caused by a communication interrupt.

Application interrupt start may be caused to occur by an external communication interrupt as well as user's selection. FIG. 9 is a flowchart to show a flow of the interrupt start caused by a communication interrupt. When mail or a telephone call is received with application displayed (step S141), interrupt handling is executed based on predefined interrupt display setting. In the interrupt display setting, starting the application required for interrupt handling (mailer, telephone) or displaying the currently displayed application when an interrupt occurs is selected. If the interrupt display setting is enabled, it is made possible to rewrite new contents into the reference table so that the application required for the interrupt handling is assigned the highest priority. When the interrupt display setting is disabled, if an interrupt occurs, the current application is displayed (step S143) without starting the application required for the interrupt handling. In this case, the user is informed that the interrupt occurred by any means other than starting the application (popup display on screen, caution, etc.,). When the interrupt display setting is enabled, the application required for the interrupt handling is selected (step S144), the reference table in which the selected application is set to the highest priority is referenced, and the application required for the interrupt handling is displayed (step S145). After completion of the interrupt handling, the former (interrupted) application is displayed.

To display the application required for the interrupt handling, when only one display screen is applied, the application required for the interrupt handling is activated for display and the application displayed so far is operated in the background. After completion of the interrupt handling, the application operated in the background is again activated for display.

When a plurality of display screens are developed (unfolded), the application required for the interrupt handling is activated for display and the application displayed so far is operated in the background (processing within one display screen). Alternatively, the application displayed so far is switched into another display screen (processing across display screens). After completion of the interrupt handling, the application operated in the background is again activated and is restored to the former display state.

The processing across display screens will be discussed by taking the case where three display screens are developed (unfolded) as an example. The application required for the interrupt handling is displayed on the first display screen; the application displayed on the first display screen is displayed on the second display screen; the application displayed on the second display screen is displayed on the third display screen; and the application displayed on the third display screen is operated in the background.

Next, the reference table update operation responsive to the power off operation of the terminal will be discussed. As described above, when the user starts the applications A, B, and C on the display devices 1a, 1b, and 1c respectively and then turns off the power with the application B active (column of priority 1), the reference table is updated as under the column of user setting before the power of the terminal is turned off. When the user again turns on the power with all display devices exposed, the applications A, B, and C are started and the application B is displayed in active mode. On the other hand, when the user again turns on the power with only the display device 1a exposed, only the application B is started. Then, if the user exposes the display devices 1b and 1c, the applications A and C are started according to the column of user setting, and the already started application B is moved to the display device 1b and is activated.

When the user performs interrupt start of applications to be started on the display devices in a combination not involved in the default setting of the reference table (for example, application J on the display device 1a, application K on the display device 1b, and application L on the display device 1c) and turns off the power in this state, information indicating the started applications and the active display devices is updated before the power of the terminal is turned off (column of user setting in the reference table shown in FIG. 8B). When the user again turns on the power with all display devices exposed, the applications J, K, and L are started and the application L on the display device 1c is displayed in active mode. On the other hand, when the user again turns on the power with only the display device 1a exposed, the application to be activated is the application L and thus only the application L is started. Then, if the user exposes the display devices 1b and 1c, the applications J and K are started according to the column of user setting, and the already started application L is moved to the display device 1c and is activated.

Not only the applications, but also different pages of the same application or windows of a file folder may be set in the reference table in FIG. 8. For example, the reference table can be set so as to display the first and second sheets of the same spreadsheet software on different display devices or separately display windows of a text editor and a folder retaining the file used with the text editor.

As described above, the two types of settings of the default setting with the priority and the user setting with the use history are placed in the reference table in the embodiment, but either of them may be specified for use. Only either of the settings may be placed in the reference table. Further, the user can also directly edit and update the reference table by entry through the keyboard 2 rather than updating of the reference table based on the use history. As for the format and setting and updating methods of the reference table, other various methods are possible, but the invention is not limited to them.

In the invention, the number of display devices is not limited to three. Further, the display storing and developing method is not limited to the folding manner either, and a sliding manner up and down or from side to side may be used.

As described above, according to the invention, the applications to be displayed on the display device are displayed in a predetermined order each time the display devices are developed, so that ease of use can be improved when a plurality of applications are started in the information terminal having a plurality of display devices.

According to the invention, the applications to be displayed on the display devices are started as the table in which the priority of a plurality of applications is set is referenced, so that ease of use can be improved when a plurality of applications are started in the information terminal having a plurality of display devices.

What is claimed is:

1. An information terminal, comprising:
 a plurality of display devices configured to be developed from a stored position; and
 a controller which controls start and display of any application to be displayed on each of the plurality of display devices;
 wherein the controller displays a plurality of applications in a predetermined order on the plurality of display devices each time the plurality of display devices are developed from the stored position,
 wherein the controller references a table in which a priority of the plurality of applications is set, and displays the plurality of applications on the display devices in the predetermined order based on the priority.

2. An information terminal, comprising:
 a plurality of display devices; and
 a controller which controls start and display of any application to be displayed on each of the display devices;
 wherein the controller references a table in which a priority of a plurality of applications is set, and determines the applications to be displayed on the plurality of display devices based on the priority.

3. The information terminal as claimed in claim 2, further comprising a power controller which turns on and off power of any display device.

4. The information terminal as claimed in claim 3, wherein when the power of a display device displaying an active application is turned off, the controller displays the application displayed on the display device on any other display device being powered.

5. The information terminal as claimed in claim 3, wherein the controller references the table and determines the applications to be displayed on the plurality of display devices whose power is turned on by the power controller.

6. The information terminal as claimed in claim 5, further comprising: a main unit;
 wherein the display devices are stored in the main unit so that they can be developed; and
 wherein the controller does not terminate the application displayed on the display device stored in the main unit and operates the application in a background.

7. The information terminal as claimed in claim 2, further comprising:
 a main unit; and
 a power controller;
 wherein the display devices are stored in the main unit so that the plurality of display devices can be developed; and
 wherein the power controller turns on power of the developed display devices.

8. The information terminal as claimed in claim 7,
 wherein the power controller turns off power of the display devices stored in the main unit.

9. The information terminal as claimed in claim 2, wherein the priority set in the table is updated based on application start frequency.

10. The information terminal as claimed in claim 2, wherein the table is rewritten so that an application required for external interrupt handling is assigned the highest priority.

11. A display control method of an information terminal, wherein a plurality of display devices stored in the information terminal in a developable manner, the method comprising:
 setting start and display of applications in a predetermined order; and
 controlling start and display of any application to be displayed on each of the plurality of display devices in the predetermined order each time the plurality of display devices are developed,
 wherein a table, in which a priority of the plurality of applications is set, is referenced, and the plurality of applications are displayed on the plurality of display devices in the predetermined order based on the priority.

12. A display control method of an information terminal, wherein the information terminal includes a plurality of display devices to display applications, the method comprising:
 providing the plurality of display devices, which are configured to be developed from a stored position;
 controlling start and display of any application to be displayed on each of the plurality of display device; and
 displaying a plurality of applications in a predetermined order to the plurality of display devices each time the plurality of display devices are developed from the stored position,
 wherein said displaying the plurality of applications includes referencing a table in which a priority of the application is set, and displaying the plurality of applications on the display devices in the predetermined order based on the priority.

13. A display control program of an information terminal, wherein the information terminal includes a plurality of display devices and a computer, the program for causing the computer to function as:

a controller which controls start and display of applications to be displayed on each of the display devices in a predetermined order each time the display devices are developed, wherein the controller is caused to function so as to reference a table in which a priority of a plurality of applications is set, determine the plurality of applications to be displayed on the plurality of display devices based on the priority, and display the plurality of applications in a predetermined order based on the priority.

14. The display control program as claimed in claim 13 for further causing the computer to function as power controller which turns on and off power of any display device.

15. The display control program as claimed in claim 14 wherein when the power of the display device displaying an active application is turned off, the controller is caused to function so as to display the application displayed on the display device on any other display device being powered.

16. The display control program as claimed in claim 14, wherein the controller is caused to function so as to reference the table and determine the applications to be displayed on the display devices whose power is turned on by the power control means.

17. The display control program as claimed in claim 16 wherein the controller does not terminate the application displayed on the display device stored in a main unit and operates the application in a background.

18. The display control program as claimed in claim 13, wherein the display devices are stored in a main unit so that they can be developed; the program for further causing the computer to function as:

a power controller which turns on power of the developed display devices.

19. The display control program as claimed in claim 18, wherein the power controller is caused to function so as to turn off power of the display devices stored in the main unit.

20. The display control program as claimed in claim 13 wherein the priority set in the table is updated based on application start frequency.

21. The display control program as claimed in claim 13 wherein the table is rewritten so that an application required for external interrupt handling is assigned the highest priority.

* * * * *